United States Patent [19]

Kinugawa et al.

[11] Patent Number: 4,736,302

[45] Date of Patent: Apr. 5, 1988

[54] CONTROL SYSTEM FOR DETERMINING THE QUANTITY OF INTAKE AIR OF AN INTERNAL COMBUSTION ENGINE

[75] Inventors: Masumi Kinugawa, Okazaki; Norio Omori, Kariya; Tomoaki Abe, Nagoya; Katsunori Ito, Aichi; Susumu Akiyama, Kariya; Yuzi Hirabayashi, Aichi, all of Japan

[73] Assignee: Nippondenso Co., Ltd., Kariya, Japan

[21] Appl. No.: 742,524

[22] Filed: Jun. 7, 1985

[30] Foreign Application Priority Data

Jun. 13, 1984 [JP] Japan ................................ 59-121519

[51] Int. Cl.[4] ........................ F02M 51/00; G01F 1/68

[52] U.S. Cl. .......................... 364/431.05; 364/431.12; 73/204; 73/118.1

[58] Field of Search ....................... 364/431.04, 431.05, 364/431.12, 510; 73/204, 118.1; 123/494

[56] References Cited

U.S. PATENT DOCUMENTS

| | | | |
|---|---|---|---|
| 3,803,913 | 4/1974 | Tracer . | |
| 3,928,800 | 12/1975 | Streglein . | |
| 4,275,695 | 6/1981 | Bauer et al. | 73/118.1 |
| 4,304,129 | 12/1981 | Kawai et al. . | |
| 4,334,186 | 6/1982 | Sasayama et al. . | |
| 4,357,830 | 11/1982 | Kohama et al. . | |
| 4,404,846 | 9/1983 | Yamauchi et al. . | |
| 4,409,828 | 10/1983 | Kohama et al. . | |
| 4,424,568 | 1/1984 | Nishimura et al. . | |
| 4,457,167 | 7/1984 | Sumal | 73/118.1 |
| 4,501,145 | 2/1985 | boegli . | |
| 4,523,284 | 6/1985 | Amano et al. | 364/431.12 |
| 4,587,842 | 5/1986 | Handtmann . | |
| 4,596,138 | 6/1986 | Ito et al. | 73/204 |

FOREIGN PATENT DOCUMENTS

| | | |
|---|---|---|
| 0144027 | 11/1984 | European Pat. Off. . |
| 51-64134 | 6/1976 | Japan . |
| 55-57112 | 4/1980 | Japan . |
| 55-104538 | 8/1980 | Japan . |
| 56-24521 | 3/1981 | Japan . |
| 884462 | 12/1961 | United Kingdom . |

*Primary Examiner*—Parshotam S. Lall
*Attorney, Agent, or Firm*—Cushman, Darby & Cushman

[57] ABSTRACT

A system for controlling the operating condition of an engine in which a temperature sensing element constitutes an airflow measuring device disposed in an intake air passage of the engine. The temperature sensing element is supplied with a heating current in response to a start pulse signal produced with every one-half period of each combustion cycle of the engine. A comparator delivers an output signal when a reference temperature set on the basis of the air temperature measured by an auxiliary temperature sensing element is reached by the temperature of the temperature sensing element. A pulse signal indicative of the time interval between the generation of the start pulse signal and a rise in the output signal of the comparator is delivered as an airflow measurement signal. The average airflow quantity responsive to one combustion cycle of the engine is detected, and a correction factor K is calculated from the difference between two airflow rate data measured in each combustion cycle and the average airflow quantity. Based on the correction factor K, the injection quantity, injection timing and the like are calculated.

10 Claims, 6 Drawing Sheets

FIG. 4
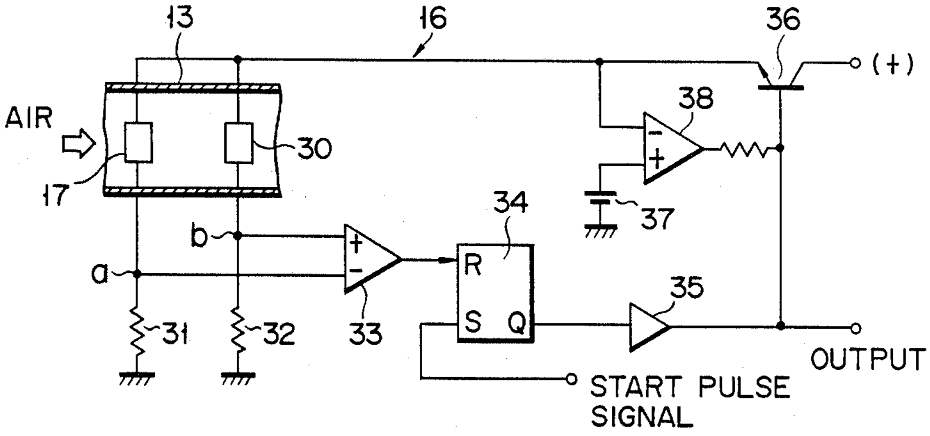
FIG. 5A
FIG. 5B
FIG. 5C
FIG. 5D
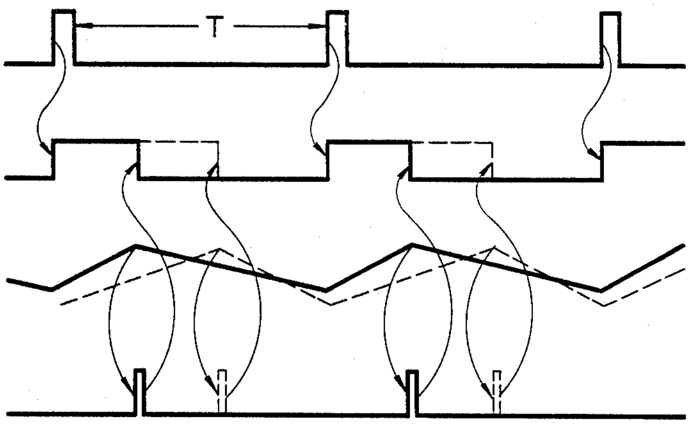

CONTROL SYSTEM FOR DETERMINING THE QUANTITY OF INTAKE AIR OF AN INTERNAL COMBUSTION ENGINE

BACKGROUND OF THE INVENTION

The present invention relates to a control system for an engine, and more specifically to an electronic control system using a microcomputer in which means for measuring the quantity of intake air supplied to the engine is improved so that a digitally represented measurement output can be provided for effective use and so that the measurement of the intake air quantity can accurately be executed for high-accuracy injection quantity control for the engine even under a high engine load condition.

To electronically control the operating condition of an engine, the engine condition needs to be monitored continually. Monitoring means for the engine condition include means for measuring the quantity of intake air. As an example of an intake air quantity measuring means for an engine, an airflow measuring device of a heat-wire type is conventionally known which is set in an intake passage of the engine. This measuring device is constructed so that a temperature sensing element, which is adapted to generate heat when supplied with a heating current, is disposed in the intake passage. The quantity of air passing through the intake passage is measured by determining the temperature change of the temperature sensing element.

The temperature sensing element is formed of a resistance element which has a temperature characteristic such that resistance depends on temperature. Thus, the temperature of the temperature sensing element can be measured by determining its resistance. Since the temperature sensing element is disposed in the intake passage, the amount of heat radiated from the temperature sensing element varies with the quantity of intake airflow. Therefore, if the heating current, for example, is controlled so that the temperature sensing element is kept at a fixed temperature, the level of the heating current is proportional to the intake airflow quantity. Thus, the intake airflow quantity may be detected from the value of the heating current.

For electronically calculating the injection quantity for the engine to execute fuel injection control on the basis of a measurement signal indicative of the intake air quantity, a microcomputer is used as an arithmetic control means therefor. Thus, the measurement signal from the airflow measuring device is converted into digital data before it is supplied to the microcomputer. Namely, if the airflow measurement signal is analog data such as a current value, the engine control system requires an A/D converter with very high accuracy, thereby complicating system construction.

SUMMARY OF THE INVENTION

An object of the present invention is to provide a control system for an engine so constructed that an intake airflow measurement signal for the engine is digitally expressed for effective use in a microcomputer, the control unit of the engine being formed of an electronic apparatus using the microcomputer and the engine control unit being fully simplified in construction to permit simple calculation of injection quantity.

Another object of the invention is to provide a control system for an engine in which the quantity of intake airflow can accurately be measured especially when the engine is operated in a high load condition, thus ensuring high-accuracy intake airflow measurement for high-accuracy operation control under any operating condition.

In the engine control system according to the present invention, a temperature sensing element comprising a heat generating element having a temperature-resistance characteristic such that its resistance is established in response to its temperature is disposed in an intake passage of the engine. The temperature sensing element is supplied with a heating current in response to a start pulse signal which is generated for every two periods of each engine combustion cycle. When the temperature of the temperature sensing element, which is adapted to generate heat when supplied with the heating current, rises to a specified level, and this level is detected, the heating current supply is interrupted, and a pulse signal indicative of a time duration equivalent to the period of time during which the heating current is supplied to the temperature sensing element is delivered as an airflow measurement signal. Thus, two airflow measurement signals are generated in each engine combustion cycle. A correction value for the airflow measurement signals is calculated from the average of and the difference between the two measurement signals. The measurement signals are operated to correct the airflow data in accordance with the correction value. Based on the corrected airflow data, calculation of the injection quantity and the like is executed.

In the engine control system described above, therefore, the quantity of air passing through the intake passage is represented by a time period, so that it can be handled as a digital measurement output signal by measuring the time period by clock signal counting. Thus, in supplying the measurement signal to a control unit formed of a microcomputer to execute engine control, the measurement signal can directly be used without requiring A/D conversion, greatly facilitating simplification of the control system in construction.

Further, accurate intake airflow measurement can be executed without fail even if the intake air for the engine is subject to pulsation caused by engine rotation, and especially if a high engine load condition makes components of the pulsation so great that there are backflow components responsive to the pulsation. Namely, the measurement is executed twice for each combustion cycle of the engine, and a correction value is set corresponding to two measurement results so that the airflow measurement signal is corrected in accordance with the correction value. Thus, the engine can be electronically controlled with high accuracy under any operating conditions.

BRIEF DESCRIPTION OF THE DRAWINGS

FIG. 4 is a circuit diagram for illustrating the airflow measuring device;

FIGS. 5A, 5B, 5C and 5D show signal waveforms illustrating several measuring operation modes of the airflow measuring device;

DETAILED DESCRIPTION OF THE PREFERRED EMBODIMENTS

Figure 1:
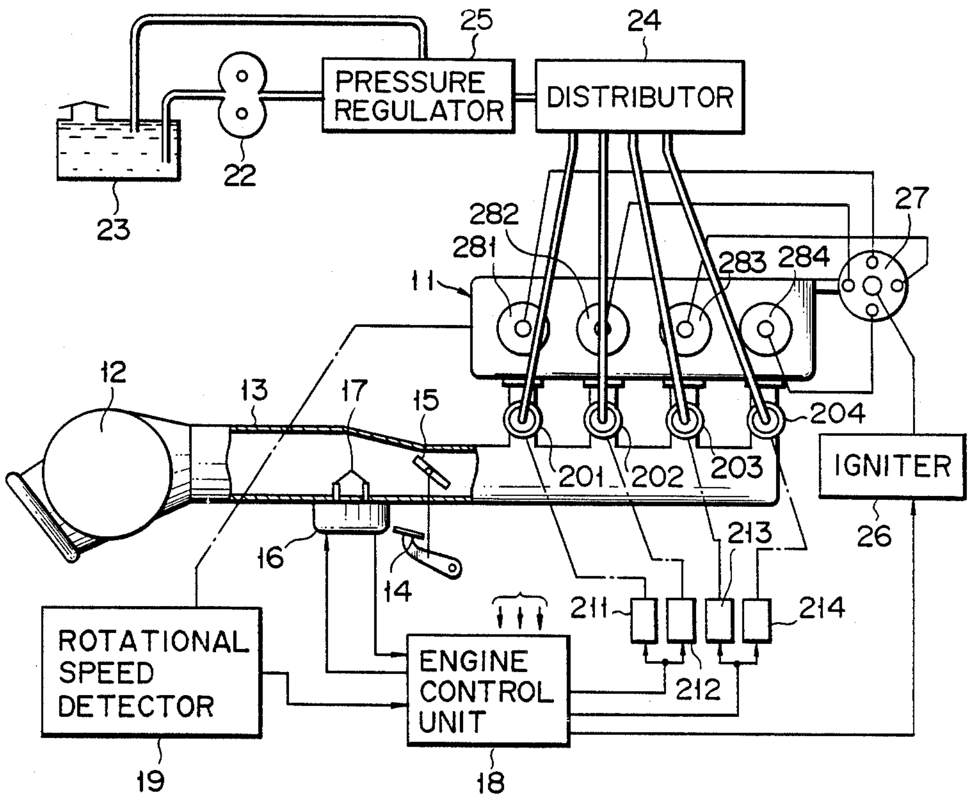
FIG. 1 is a diagram for illustrating a control system for an engine according to one embodiment of the present invention.

FIG. 1 schematically shows a control system for a four-cycle four-cylinder engine 11. In this system, injection quantity, ignition timing and the like which are compatible with the operating conditions of the engine 11 are electronically calculated for the operation control of the engine 11.

Intake air for the engine 11 is introduced through an air filter 12 and distributed to a plurality of cylinders of the engine 11 through an intake passage 13. The intake passage 13 is provided with a throttle valve 15 which is driven by an accelerator pedal 14. A temperature sensing element 17 constituting an airflow measuring device 16 of a heat-wire type is set in the intake passage 13. The temperature sensing element 17, which generates heat when supplied with electric power, is formed of a heater, such as a platinum wire, which has such a temperature-resistance characteristic that its resistance depends on its temperature.

A measurement output signal delivered from the airflow measuring device 16 is supplied to an engine control unit 18 which is formed of a microcomputer. The temperature sensing element 17 is controlled for its generation of heat in accordance with an instruction from the control unit 18.

The engine control unit 18 is further supplied, as detection signals for the operating conditions of the engine 11, with output signals from a rotational speed detector 19 for detecting the rotating conditions of the engine 11, an engine cooling water temperature detector (not shown), an exhaust gas temperature detector (not shown), an air-fuel ratio detection signal, etc. The rotational speed detector 19 delivers signals responsive to crank angular positions, 60 degrees and 150 degrees, of the cylinders of the engine 11. In response to these detection signals, the control unit 18 calculates an injection quantity compatible with the current operating conditions of the engine 11, and supplies injection period signals responsive to the injection quantity to injectors 201, 202, 203 and 204 which are provided corresponding to the individual cylinders of the engine 11. In this case, signals for the injection quantity are pulse signals indicative of time durations, which are supplied to the injectors 201 to 204 through resistors 211, 212, 213 and 214, respectively, for protection. Thus, the injection quantity is determined in response to the valve-open periods of the injectors 201 to 204.

The injectors 201 to 204 are supplied through a distributor 24 with fuel which is delivered from a fuel tank 23 by a fuel pump 22. The pressure of the fuel fed to the distributor 24 is kept constant by a pressure regulator 25, so that the injection quantity can accurately be set in accordance with the valve-open periods of the injectors 201 to 204.

The engine control unit 18 also gives an instruction to an igniter 26 so that ignition signals are supplied through a distributor 27 to ignition coils 281, 282, 283 and 284 which are provided corresponding to the engine cylinders.

Figure 2:
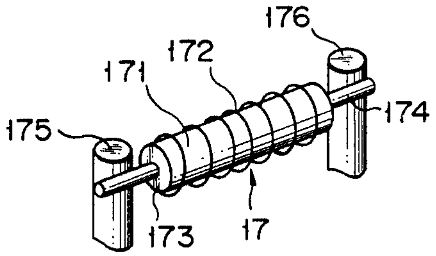
FIGS. 2 and 3 are perspective views individually showing temperature sensing elements of different arrangements constituting an airflow measuring device used in the engine control system of FIG. 1.

FIG. 2 shows an embodiment of the temperature sensing element 17 constituting the airflow measuring device 16, in which a resistance wire 172 with a temperature resistance characteristic is wound around a ceramic bobbin 171. Shafts 173 and 174 formed of a good conductor protrude individually from both end portions of the bobbin 171. The shafts 173 and 174 are supported by pins 175 and 176, respectively. Thus, heating current may be supplied to the resistance wire 172 through the pins 175 and 176.

Figure 3:
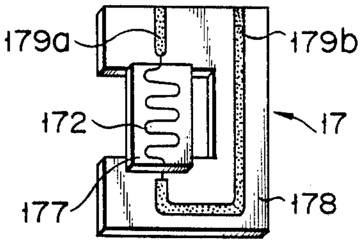

FIG. 3 shows a modified example of the temperature sensing element 17, in which the resistance wire 172 is formed by printed wiring on an insulator film 177. The film 177 is supported on a substrate 178 formed of an insulator. Wires 179*a* and 179*b* connected to the resistance wire 172 are formed on the surface of the substrate 178.

FIG. 4 shows a circuit arrangement of the airflow measuring device 16 used in the aforesaid manner. As shown in FIG. 4, an auxiliary temperature sensing element 30, as well as the temperature sensing element 17, is set inside the intake passage 13. The auxiliary temperature sensing element 30 is constructed in the same manner as the temperature sensing element 17. The auxiliary temperature sensing element 30, whose resistance value is set in accordance with the temperature of air passing through the intake passage 13, serves as an air temperature measuring element.

The two temperature sensing elements 17 and 30, along with fixed resistors 31 and 32 connected respectively thereto, constitute a bridge circuit. Nodes a and b as output terminals of the bridge circuit are connected to a comparator 33. The comparator 33 delivers an output signal when the temperature of the temperature sensing member 17 rises to a level such that there is a specified difference between it and the air temperature measured by the auxiliary temperature sensing element 30. The output signal from the comparator 33 serves for reset control of a flip-flop circuit 34.

The flip-flop circuit 34 is set by a start pulse signal which is supplied from the engine control unit 18. The start pulse signal is a signal which is synchronized with the rotation of the engine 11. An output signal from the flip-flop circuit 34, which goes high when the flip-flop circuit 34 is set, is delivered as an output signal with a set pulse duration through a buffer amplifier 35, and serves to control the base of a transistor 36 for intermittent, pulsative control of electric current supplied to the bridge circuit including the temperature sensing element 17. In this case, a reference voltage source 37 and a differential amplifier 38 constitute a reference voltage setting circuit, which regulates the voltage of heating current supplied to the bridge circuit.

If the start pulse signal is generated in synchronism with the rotation of the engine 11, as shown in FIG. 5A, the flip-flop circuit 34 is set by the start pulse signal, so that the output signal from the circuit 34 rises, as shown in FIG. 5B. In response to this output signal, the transistor 36 is turned on to allow the heating current to be supplied to the temperature sensing element 17, thereby causing the temperature of the temperature sensing element 17 to rise as shown in FIG. 5C.

When the temperature of the temperature sensing element 17 rises to a level such that there is a specified difference between it and the air temperature measured by the auxiliary temperature sensing element 30, an output signal from the comparator 33 rises, as shown in FIG. 5D, to reset the flip-flop circuit 34.

The air flowing through the intake passage 13 functions as a heat radiating element for the temperature sensing element 17. Where the voltage value of the heating electric power is constant, the speed of the temperature rise in the temperature sensing element 17 is responsive to the quantity of airflow in the intake passage 13. More specifically, the temperature rise speed of the temperature sensing element 17 is low when the airflow quantity is large, and the former increases as the latter decreases. Accordingly, the period of time when the flip-flop circuit 34 is set is proportional to the flow quantity of intake air, and the output pulse signal (FIG. 5B) from the flip-flop circuit 34 serves as a measurement output signal whose pulse width is indicative of a measured value of intake air.

Figure 6A:
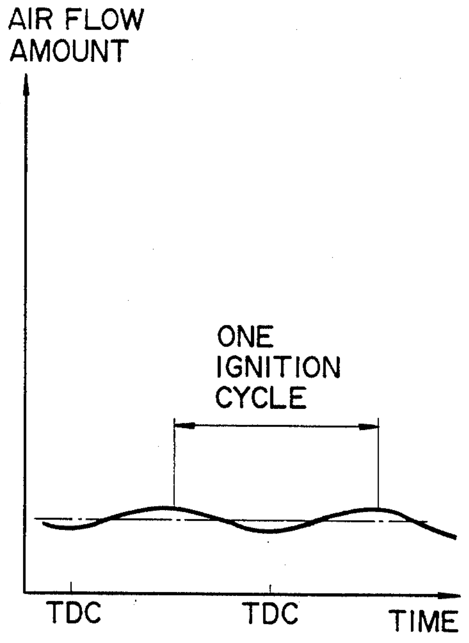
FIGS. 6A, 6B and 6C are diagrams showing pulsation modes of intake air under different engine load conditions.
Figure 6B:
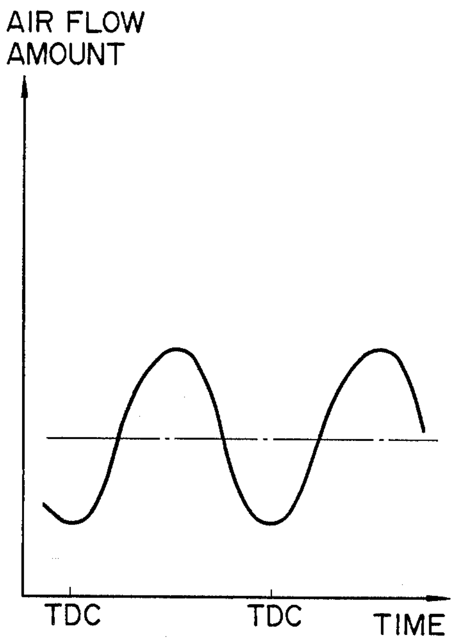

FIGS. 6A and 6B show different states of intake airflow in the intake passage 13 obtained under low and medium load conditions of the engine 11, respectively. In these drawings, full lines represent the airflow rate varying with every ignition cycle or combustion cycle, while chain lines indicate display modes of the detected airflow rate.

Figure 6C:
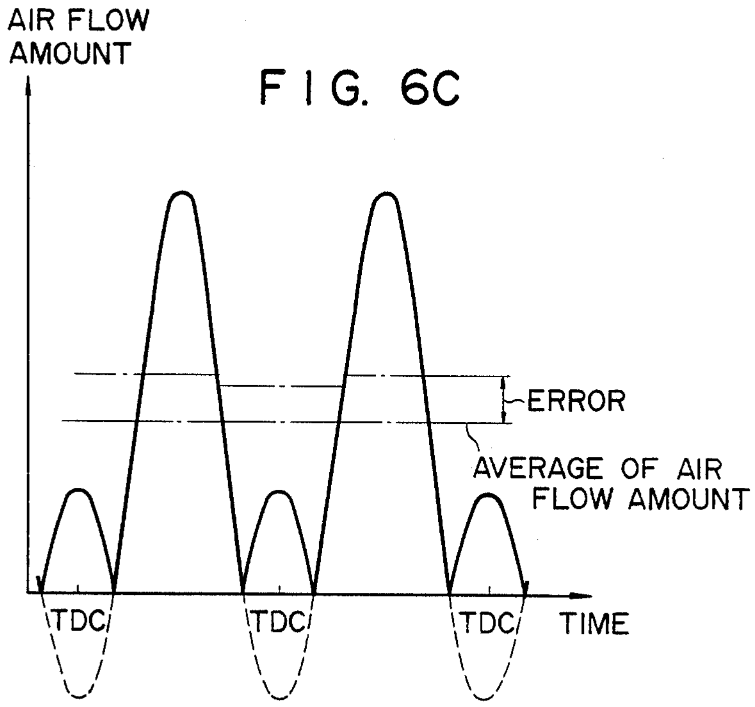

When the engine 11 is under a high load condition, backflow components of intake air pulsation of the engine 11 are produced, as indicated by broken lines in FIG. 6C. The backflow components of the intake air pulsation, which appear substantially at the top dead center of each engine cylinder, are detected by the temperature sensing element 17 in conditions equivalent to those for normal airflow components. Therefore, if the start pulse signal is generated in synchronism with, e.g., each combustion cycle so that the heating current for the temperature sensing element 17 is controlled thereby, the aforesaid backflow components are detected as measurement errors. Thus, an erroneous difference may exist between the real average airflow quantity and the detected one.

Figure 7A:
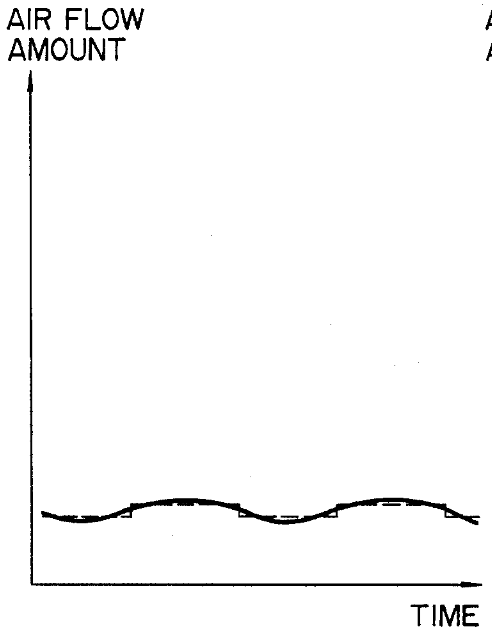
FIGS. 7A, 7B and 7C are diagrams showing display modes of a measurement output signal compared with the modes of intake air shown in FIGS. 6A to 6C.
Figure 7B:
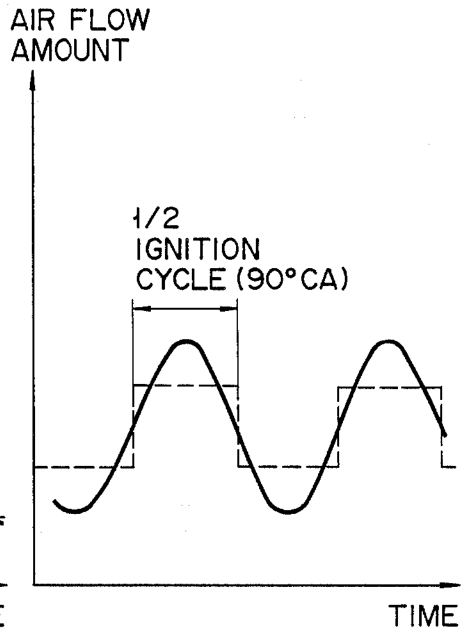
Figure 7C:
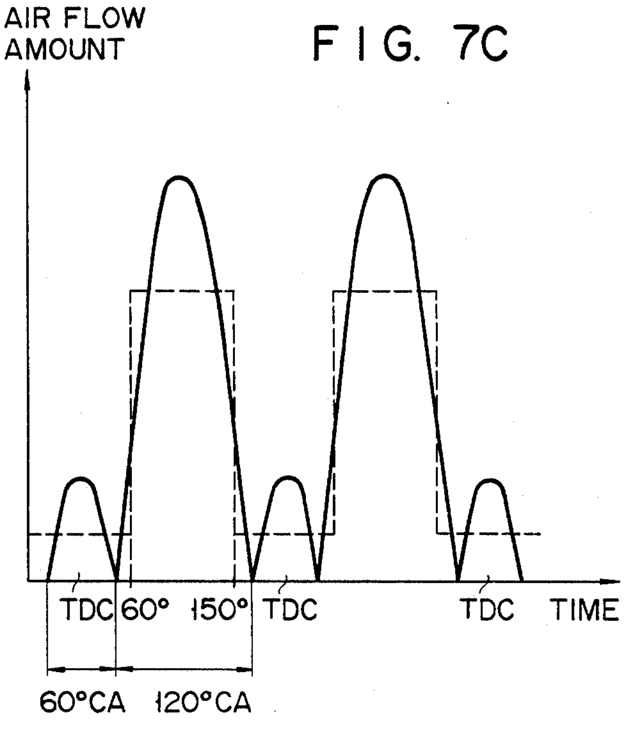

In the airflow measuring device 16, therefore, the start pulse signal is generated with every one-half period of each combustion cycle of each cylinder. More specifically, in the case of the four-cycle, four-cylinder engine, the start pulse signal is generated with every engine crank cycle of 90 degrees CA. In FIGS. 7A, 7B and 7C, broken lines represent display modes of the measurement output signal obtained in response to the start pulse signal, varying with pulsation of airflow in the intake passage 13. Like FIGS. 6A, 6B and 6C, FIGS. 7A, 7B and 7C correspond to low, medium and high load conditions, respectively.

Figures 8, 9:
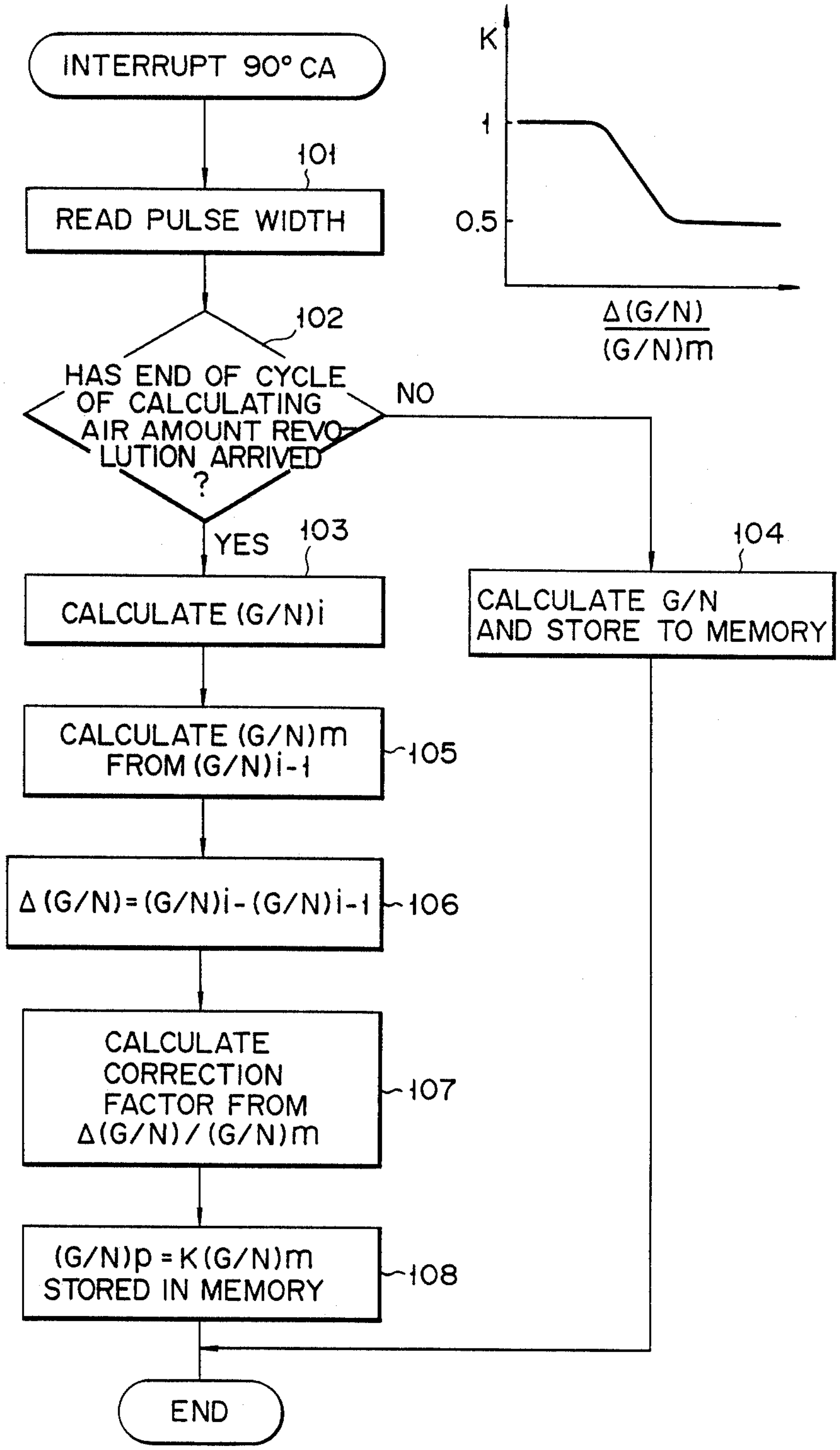
FIG. 8 is a flow chart showing an interrupt processing routine for the output signal of the airflow measuring device applied to a microcomputer constituting the control unit.
FIG. 9 is a diagram showing a correction factor K calculated in the interrupt processing shown in FIG. 8.

In the engine control unit 18, injection quantity, ignition timing and the like are calculated with the use of airflow quantity per revolution "G/N" which is calculated on the basis of the aforesaid airflow measurement signal. FIG. 8 is a flow chart showing a sequence of processes for extracting an airflow rate signal "G/N" used in the control unit 18. First, interrupt processing for calculating the airflow quantity is executed for each 90 degrees CA of the engine 11, i.e., at crankshaft positions 60° and 150° as shown in FIG. 7C. In step 101, the pulse duration T of the output pulse signal from the measuring device 16 is measured and read by a high-speed input counter. Then, in step 102, the period during which the duration T is read is checked for correspondence to any ignition cycle of the engine 11.

Since the start pulse signal for the execution of the airflow measuring operation by the airflow measuring device 16 is set for each one-half combustion cycle or one-half ignition cycle, the period for reading the duration T does and does not correspond to the ignition cycle, alternately. If the period for reading the duration T corresponds to the ignition cycle in step 102, step 103 is entered; if not, step 104 is entered. In step 103, an airflow rate (G/N)i for the detected cycle is calculated from the measured duration T. In step 104, G/N is calculated as it is.

The duration T as compared with quantity of air G and engine speed (number of revolutions) N may be expressed as follows:

$$T \propto (\alpha + \beta\sqrt{G})/N,$$

where $\alpha$ and $\beta$ are constants.

Therefore, the airflow rate data G/N can be read from a two-dimensional map, based on the duration T and engine speed N. The data G/N calculated in step 104 is stored directly in a memory when the sequence of operations ends.

In step 105, the data (G/N)i obtained in step 104 is added to (G/N)i−1 for the preceding detected cycle to obtain an average airflow rate data signal (G/N)m. The data (G/N)i−1 used here is the G/N stored in the memory in step 104. Subsequently, in step 106, the data (G/N)i−1 is subtracted from the data (G/N)i to find the remainder or the difference Δ(G/N). In step 107, a correction factor K is calculated from the previously calculated Δ(G/N) and (G/N)m.

FIG. 9 shows an experimental relationship between the correction factor K and Δ(G/N)/(G/N)m. Thus, the correction factor K can readily be obtained from a stored map or the like. The Δ(G/N)/(G/N)m is thus obtained on the basis of FIGS. 8 and 9 for the purpose of discrimination of the load condition of the engine 11. The higher the engine load, the greater the Δ(G/N) and hence the greater the Δ(G/N)/(G/N)m will be.

After the correction factor K is obtained in the aforesaid manner, an airflow data signal (G/N)p to be used in injection quantity calculation control for each ignition cycle or combustion cycle is calculated in step 108. Thus, the interrupt processing for airflow calculation ends.

Figure 10:
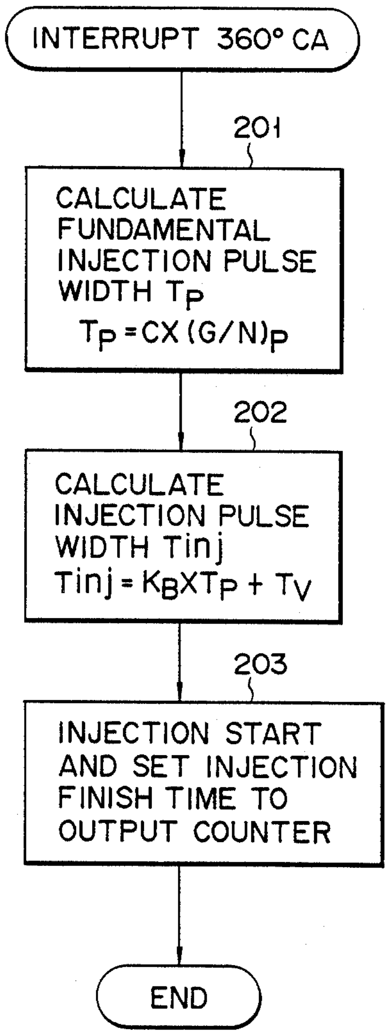
FIGS. 10 and 11 show flow charts for explaining interrupt routines for an operation on a fuel injection amount and ignition time, respectively.

FIG. 10 is a flow chart showing the flow of interrupt processing for the calculation of injection quantity in the engine control unit 18. The interruption is executed at every 360 degrees CA of the engine 11. In step 201, a fundamental injection pulse width Tp is calculated on the basis of the airflow data (G/N)p.

After the fundamental injection pulse width Tp is calculated, a final injection pulse width Tinj is calculated in step 202. In calculating the pulse width Tinj, a correction factor $K_B$ calculated in response to the engine cooling water temperature detection signal, air-fuel ratio detection signal and the like and an add correction term $T_V$ are used. Then, in step 203, a valve-opening instruction is given to each injector to start fuel injection, and an output counter is set to an injection end time responsive to the injection pulse width Tinj.

The fuel injection control executed in a manner such that the injection of each injector ends when time counting of the output counter then finishes.

Figure 11:
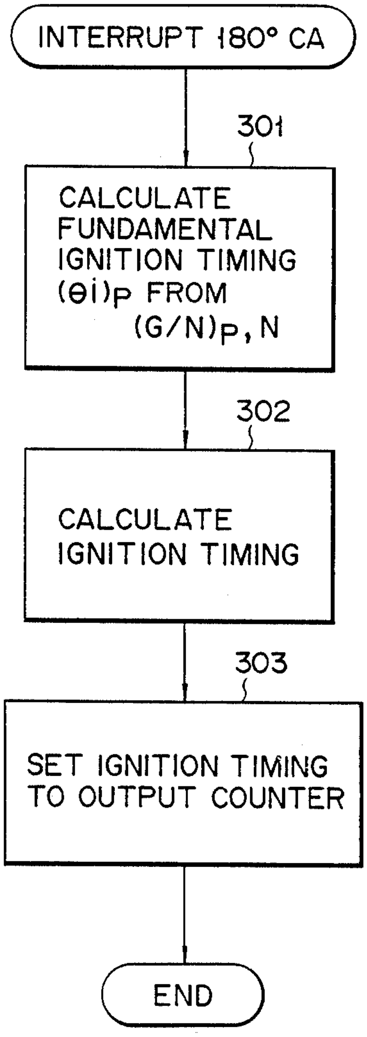

FIG. 11 is a flow chart showing the flow of interrupt processing for ignition timing in the engine control unit 18. First, in step 301, a fundamental ignition timing $(\theta i)p$ is calculated from the $(G/N)p$. The value of the fundamental ignition timing $(\theta i)p$ is experimentally obtained from the relationship between, for example, $(G/N)p$ and engine speed N. The value obtained in this manner may be read from, e.g., a two-dimensional map. After the fundamental injection timing is thus obtained, the correction operation is executed, in step 302, on the basis of a correction value obtained in accordance with the detection signals for the operating conditions of the engine 11 which are the same as used in the injection quantity calculation. Thus, a final injection timing is calculated. In step 303, the final ignition timing is set in the output counter.

In the embodiment described above, the intake airflow measuring operation is described as being executed with every one-half combustion cycle or 90 degrees CA interval. Alternatively, as shown in FIG. 7C, the combustion cycle may be divided by 60 degrees CA interval and 120 degrees CA interval so that the airflow measurement is executed at two points corresponding to the points of division.

What is claimed is:

1. A control system for an engine having an intake air passage, comprising:

means for generating a first signal with every predetermined angular rotation of the engine equivalent to one-half period of each engine cycle;

means disposed in the intake passage for generating heat in accordance with an electric current supplied thereto;

means for detecting the temperature of air passing through the intake passage;

means for establishing a reference temperature in accordance with air temperature detected by the air temperature detecting means;

means for comparing the temperature of the heat generating means with the reference temperature established by the reference temperature establishing means;

means for generating a second signal starting with the first signal and ending with an output of the comparing means indicating that the reference temperature is reached by the temperature of the heat generating means;

means for supplying the heat generating means with the electric current during the time period of the second signal;

means for determining a correction coefficient as a function of first and second variables, said first variable being proportional to the time period of the second signal previously produced and said second variable being proportional to the time period of the second signal currently produced;

means for determining the quantity of air passing through the intake air passage in proportion to the product of the correction coefficient and the sum of the first and second variables; and means for controlling the engine in accordance with the determined quantity of air.

2. A control system according to claim 1, wherein said correction coefficient determining means includes means for determining the first variable from the time period of the second signal produced previously and the rotational speed of the engine, means for determining the second variable from the time period of the second signal produced currently and the rotational speed of the engine, means for determining said correction coefficient from the ratio between the sum of the first and second variables and the difference between the first and second variables including means for storing the correction coefficient with respect to the determined ratio, and means for obtaining the correction coefficient from the storing means in accordance with the determined ratio.

3. A control system for an engine having an intake air passage, comprising:

means for generating a first signal, said first signal being generated in synchronism with two rotation signals generated individually during two periods set in each engine cycle;

means disposed in the intake passage for generating heat in accordance with an electric current supplied thereto;

means for detecting the temperature of air passing through the intake passage;

means for establishing a reference temperature in accordance with the air temperature detected by the air temperature detecting means;

means for comparing the temperature of the heat generating means with the reference temperature established by the reference temperature establishing means;

means for generating a second signal starting with the first signal and ending with an output of the comparing means indicating that the reference temperature is reached by the temperature of the heat generating means in accordance with the temperature of said heat generating means;

means for supplying the heat generating means with the electric current during the time period of the second signal;

means for determining a correction coefficient as a function of first and second variables, said first variable being proportional to the time period of the second signal previously produced and said second variable being proportional to the time period of the second signal currently produced;

means for determining the quantity of air passing through the intake air passage in proportion to the product of the correction coefficient and the sum of the first and second variables; and means for controlling the engine in accordance with the determined quantity of air.

4. A control system according to claim 3, wherein a first one of said two periods set by the two rotation signals from the first signal generating means is set so as to include a point of time when air can flow backward through the intake passage, and a second period is set corresponding to a point of time when air cannot flow backward through the intake passage.

5. A control system according to claim 4, wherein said first period includes the top dead center of an engine cylinder of a four-cycle engine.

6. A control system according to claim 3, wherein said correction coefficient determining means includes means for determining the first variable from the time period of the second signal produced previously and the rotational speed of the engine, means for determining the second variable from the time period of the second signal produced currently and the rotational speed of the engine, means for determining said correction coefficient from the ratio between the sum of the first and second variables and the difference between the first and second variables including means for storing the correction coefficient with respect to the determined ratio, and means for obtaining the correction coefficient from the storing means in accordance with the determined ratio.

7. A control system according to claim 3, wherein said first signal generating means generates the first signal with every crank angle of 60 degrees CA and 120 degrees CA in each engine cycle.

8. A control system according to claim 7, wherein a period defined by the engine crank angle of 60 degrees CA includes a point of time when air can flow backward through the intake air passage, and a period corresponding to the 120 degrees CA includes a point of time when air cannot flow backward through the intake air passage.

9. A control system for an engine having an intake air passage, said system comprising:

heat generating means disposed in the intake air passage of the engine and adapted to be supplied with a heating current;

heating current supply means for controlling the heating current supplied to said heat generating means in accordance with the temperature of said heat generating means;

first measuring means for measuring a first quantity of air in said intake air passage from the heating current supplied to said heat generating means when the air flows in a forward direction in said intake air passage;

second measuring means for measuring a second quantity of air in said intake air passage from the heating current supplied to said heat generating means when the air flows in a backward direction in said intake air passage;

correction determining means for determining a correction coefficient from said first and second quantities of air, said correction determining means including: means for determining a sum of the measured first quantity of air and the second quantity of air; means for determining a difference between the measured first quantity of air and the second quantity of air; means for determining said correction coefficient from a ratio between the determined sum and the determined difference; and means for storing the correction coefficient and reading the stored correction coefficient out in accordance with the determined ratio;

quantity determining means for determining the quantity of air passing through said intake air passage from the measured first quantity of air, second quantity of air and the determined correction coefficient; and control means for controlling operation of said engine in accordance with the determined quantity of air.

10. A control system according to claim 9, wherein said heating current supply means includes: first signal generating means for generating a first signal twice in each engine cycle; comparing means for comparing the temperature of said heat generating means with a reference temperature to produce an output signal when the temperature of said heat generating means reaches the reference temperature; and second signal generating means for generating a second signal starting with the first signal and ending with the output signal from said comparing means, the second signal determining the period of supplying the current to said heat generating means and indicating the first quantity of air and the second quantity of air alternatively for respective first signals generated in each engine cycle.

* * * * *